US012734093B2

(12) United States Patent
Xiao et al.

(10) Patent No.: US 12,734,093 B2
(45) Date of Patent: Sep. 15, 2026

(54) REHABILITATION EXERCISE EQUIPMENT AND ROPE TRANSMISSION DEVICE

(71) Applicant: SHANGHAI FOURIER INTELLIGENCE CO., LTD, Shanghai (CN)

(72) Inventors: Danping Xiao, Shanghai (CN); Zhihao Yang, Shanghai (CN); Jiajun Sun, Shanghai (CN); Ke Zhang, Shanghai (CN)

(73) Assignee: SHANGHAI FOURIER INTELLIGENCE CO., LTD, Shanghai (CN)

( * ) Notice: Subject to any disclaimer, the term of this patent is extended or adjusted under 35 U.S.C. 154(b) by 693 days.

(21) Appl. No.: 18/322,752

(22) Filed: May 24, 2023

(65) Prior Publication Data

US 2023/0293377 A1 Sep. 21, 2023

Related U.S. Application Data

(63) Continuation of application No. PCT/CN2022/114481, filed on Aug. 24, 2022.

(30) Foreign Application Priority Data

Sep. 9, 2021 (CN) ......................... 202111054392.6

(51) Int. Cl.
*A61H 1/00* (2006.01)
*A61H 1/02* (2006.01)

(52) U.S. Cl.
CPC ....... *A61H 1/02* (2013.01); *A61H 2001/0207* (2013.01); *A61H 2201/1215* (2013.01); *A61H 2201/14* (2013.01); *A61H 2201/1671* (2013.01)

(58) Field of Classification Search
CPC .... A61H 1/02; A61H 2201/14; A63B 21/157; F16H 19/08; A62B 21/4049
See application file for complete search history.

(56) References Cited

U.S. PATENT DOCUMENTS 5,105,672 A 4/1992 Carson et al.
9,568,074 B2 2/2017 Gosselin
(Continued)

FOREIGN PATENT DOCUMENTS

CN 104784889 A 7/2015
CN 105972170 A 9/2016
(Continued)

OTHER PUBLICATIONS

Extended European Search Report issued in corresponding EP application No. 22866416.5 dated Jul. 11, 2024.
(Continued)

*Primary Examiner* — Margaret M Luarca
*Assistant Examiner* — Sarah B Lederer
(74) *Attorney, Agent, or Firm* — HAUPTMAN HAM, LLP

(57) ABSTRACT

A rope transmission device includes a device main body, a transmission assembly, a rope winding shaft, an oscillating piece, and two ropes. The transmission assembly is provided in the device main body, the rope winding shaft is rotatably connected to the transmission assembly, at least one continuous rope winding spiral groove is provided along the peripheral edge of the outer wall of the rope winding shaft, the rope winding spiral groove has an inner end close to the transmission assembly and an outer end remote from the transmission assembly, and the oscillating piece is provided in the device main body in such a manner that the oscillating axis around which the oscillating piece oscillates is collinear with the rotation axis of the rope winding shaft.

9 Claims, 4 Drawing Sheets

(56) References Cited

U.S. PATENT DOCUMENTS

| | | | | |
|---|---|---|---|---|
| 2010/0144504 | A1* | 6/2010 | Krell | A61H 1/0229 482/143 |
| 2019/0282425 | A1 | 9/2019 | Townsend et al. | |
| 2020/0179212 | A1* | 6/2020 | Wilkinson | A61H 1/00 |
| 2021/0068988 | A1* | 3/2021 | Ho | A61H 1/0237 |

FOREIGN PATENT DOCUMENTS

| | | | | | |
|---|---|---|---|---|---|
| CN | 107041804 | A | | 8/2017 | |
| CN | 109620637 | A | * | 4/2019 | A61H 1/02 |
| CN | 209204563 | U | | 8/2019 | |
| CN | 211986906 | U | | 11/2020 | |
| CN | 212347600 | U | | 1/2021 | |
| CN | 112594347 | A | | 4/2021 | |
| CN | 112933535 | A | | 6/2021 | |
| CN | 216148976 | U | | 4/2022 | |
| CN | 216158213 | U | | 4/2022 | |
| EP | 2505233 | A1 | | 10/2012 | |
| WO | 2005016464 | A1 | | 2/2005 | |

OTHER PUBLICATIONS

Examination Report issued in corresponding EP application No. 22866416.5 dated Jul. 30, 2024.

WIPO, International Search Report for International Application No. PCT/CN2022/114481, Nov. 1, 2022.

First Office Action issued in corresponding CN application No. 202111054392.6 dated Jul. 25, 2022.

* cited by examiner

REHABILITATION EXERCISE EQUIPMENT AND ROPE TRANSMISSION DEVICE

CROSS-REFERENCE TO RELATED APPLICATIONS

The application claims priority to Chinese patent application No. 202111054392.6, filed on Sep. 9, 2021, the entire contents of which are incorporated herein by reference.

TECHNICAL FIELD

The present invention relates to the field of rehabilitation equipment, and more particularly to rehabilitation exercise equipment and a rope transmission device.

BACKGROUND

Gear transmission mechanisms or chain transmission mechanisms are widely used in the field of mechanical transmission. It is also generally necessary to use some transmission mechanisms in the field of medical antagonistic rehabilitation training apparatuses to enable the linkage of mechanical structures.

However, for medical antagonistic rehabilitation training apparatuses, the transmission mechanism is often required to provide stable power, and the transmission mechanism is also required to drive the reciprocating motion of the corresponding mechanism. This makes it possible for a user to perform a rehabilitation exercise in such a way that the movement of the limbs can be easily withdrawn and stretched out. In addition, since the user using the antagonistic rehabilitation training apparatus is subjected to a limited tensile force, the amount of force that the medical antagonistic rehabilitation training apparatus adds to the user each time needs to be strictly controlled to prevent the force that the medical antagonistic rehabilitation training apparatus applies to the user from deviating from the expected force applied to the user. It is conceivable that if the force applied to the user by the medical antagonistic rehabilitation training apparatus is greater than the expected force applied to the user due to the deviation, the injury at the rehabilitation training part of the user will be easily aggravated.

However, it is difficult for the mechanical transmission manner of the prior art to provide stable power to the user because the transmission mechanism generates a large vibration during the operation.

On the other hand, in the prior art, a transmission mechanism (gear transmission mechanism or chain transmission mechanism) generates a large noise during the operation, thereby providing the user with a poor experience.

In addition, a part of the medical antagonistic rehabilitation training apparatus tends to train a certain part of the user correspondingly. However, before each exercise, the user usually cannot accurately and correspondingly keep the part to be exercised at the specific position of the medical antagonistic rehabilitation training apparatus. Therefore, it is common in the prior art to rely on a rehabilitation trainer for guidance. However, as the rehabilitation training continues, the part where the user needs to be trained may deviate from the part corresponding to the medical antagonistic rehabilitation training apparatus, and at this time, it is often difficult for the user himself/herself to make corrections. However, if a gear or a chain transmission manner is used for the transmission, since neither the chain nor gear is transmitted in a stepless manner, when a gear transmission or a chain transmission is used for transmission, the joint or tissue of a user is easily damaged due to a large movement range.

SUMMARY

It is an object of the present invention to provide rehabilitation exercise equipment and a rope transmission device thereof. The rope transmission device is capable of providing a stable pressure to a user so as to prevent a force applied to the user by the rope transmission device from being greater than the force expected to be applied to the user, which would otherwise aggravate the injury at a rehabilitation training part of the user.

Another object of the present invention is to provide rehabilitation exercise equipment and a rope transmission device thereof. The rope transmission device can steadily increase a user's force each time.

Another object of the present invention is to provide rehabilitation exercise equipment and a rope transmission device thereof. The rope transmission device can be driven in a stepless manner so that a user can move gently while performing rehabilitation training.

In order to achieve at least one of the above objects, the present invention provides a rope transmission device for driving a limb fixing assembly, the rope transmission device comprising:

- a device main body;
- a transmission assembly, wherein the transmission assembly is provided to the device main body;
- a rope winding shaft, wherein the rope winding shaft is rotatably connected to the transmission assembly, and at least one continuous rope winding spiral groove is provided along a peripheral edge of an outer wall of the rope winding shaft, the rope winding shaft having an inner end proximal to the transmission assembly and an outer end remote from the transmission assembly;
- an oscillating piece for driving the limb fixing assembly, wherein the oscillating piece is provided on the device main body in such a way that an oscillating axis around which the oscillating piece oscillates is collinear with a rotation [shaft] axis of the rope winding shaft; and
- two ropes, wherein one end of one of the ropes is fixed to the rope winding shaft, and it is partially wound in a portion of a groove near the inner end of the rope winding spiral groove of the rope winding shaft, and the rope is further fixed to one end of the oscillating piece around a circumference that the oscillating piece oscillates; after one end of the other rope is fixed, it is partially wound in a portion of the groove near the rope winding spiral groove, and the rope is fixed to the other end of the oscillating piece around the circumference that the oscillating piece oscillates.

According to an embodiment of the present invention, distances between two adjacent groove bodies of the rope winding spiral groove are equal.

According to an embodiment of the present invention, the transmission assembly is embodied as a motor, and the rope winding shaft is embodied as an output shaft of the motor.

According to an embodiment of the present invention, the rope transmission device comprises two rope tighteners, and the oscillating piece has a circular arc outer wall portion and at least one radial connecting portion connected to the circular arc outer wall portion, the radial connecting portion being provided to be rotatably mounted to the device main body about the oscillating axis, wherein each of the ropes is respectively connected to one rope tightener in a way that can be tightened in a tangential direction tangential to the circular arc outer wall portion.

According to an embodiment of the present invention, the rope tighteners are mounted to two ends of the oscillating piece.

According to an embodiment of the present invention, the rope tightener comprises a base, a moving block, and a tightness adjusting piece, the base being fixed to one end of the circular arc outer wall portion of the oscillating piece, and the base being provided with a perforation extending in a tangential direction tangential to the outer wall of the circular arc outer wall portion, wherein the moving block can be slidingly connected to the base in a direction in which the perforation extends, and the moving block is connected to the tightness adjusting piece in a way that can be driven.

According to an embodiment of the present invention, the tightness adjusting piece is embodied as a rotatable screw and the moving block is correspondingly provided with a threaded hole matching with the screw, the threaded hole extending in a direction parallel to the direction in which the moving block moves.

According to an embodiment of the present invention, the base forms a sliding cavity, the moving block is slidably mounted in the sliding cavity, the moving block is provided with a mounting hole in a tangential direction tangential to the outer wall of the circular arc outer wall portion, the rope is limited by the moving block after passing through the perforation and the mounting hole on the moving block, and an aperture of the mounting hole is larger than the aperture of the perforation.

According to another aspect of the present invention, the present invention provides rehabilitation exercise equipment, wherein the rehabilitation exercise equipment comprises:

any of the rope transmission devices described above; and a limb fixing assembly, wherein the limb fixing assembly is connected to the oscillating piece of the rope transmission device.

According to an embodiment of the present invention, the rehabilitation exercise equipment comprises at least two rope transmission devices and at least two link mechanisms, and rotation axes that the rope winding shafts in the two rope transmission devices rotate around are perpendicular to each other; the limb fixing assembly is fixed to the oscillating piece of one of the rope transmission devices by one link mechanism, and the limb fixing assembly is fixed to the oscillating piece of the other rope transmission device by the other link mechanism.

By understanding the subsequent description, further objects and advantages of the present invention will be fully reflected.

These and other objects, features, and advantages of the present invention are fully reflected through the following detailed description.

DETAILED DESCRIPTION OF THE EMBODIMENTS

Figure 1:
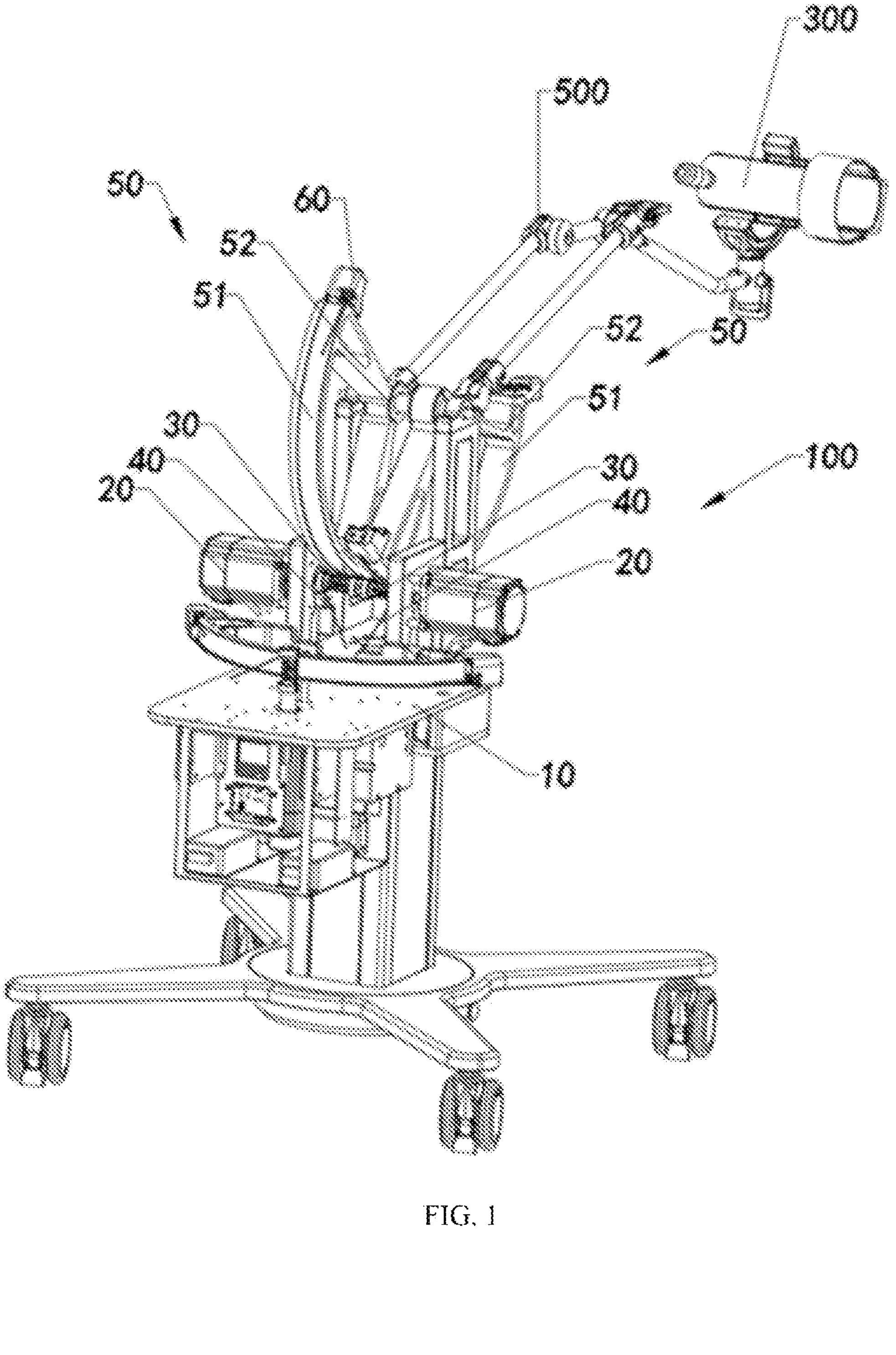
FIG. 1 shows a perspective view of rehabilitation training equipment of the present invention.

The preferred embodiments in the following description are by way of example only, and other obvious variations will occur to those skilled in the art. The basic principles of the present invention as defined in the following description can be applied to other implementation solutions, deformation solutions, improvement solutions, equivalent solutions, and other technical solutions that do not deviate from the spirit and scope of the present invention.

Those skilled in the art should understand that in the disclosure of the present invention, the orientations or positional relationships indicated by the terms “longitudinal”, “transverse”, “up”, “down”, “front”, “rear”, “left”, “right”, “vertical”, “horizontal”, “top”, “bottom”, “inner”, “outer” and the like are based on the orientations or positional relationships shown in the drawings for purposes of describing the present invention and simplifying the description only, and are not intended to indicate or imply that the referenced device or element must have a particular orientation or be constructed and operated in a particular orientation. Therefore, the above terms cannot be understood as limiting the present invention.

Figure 2:
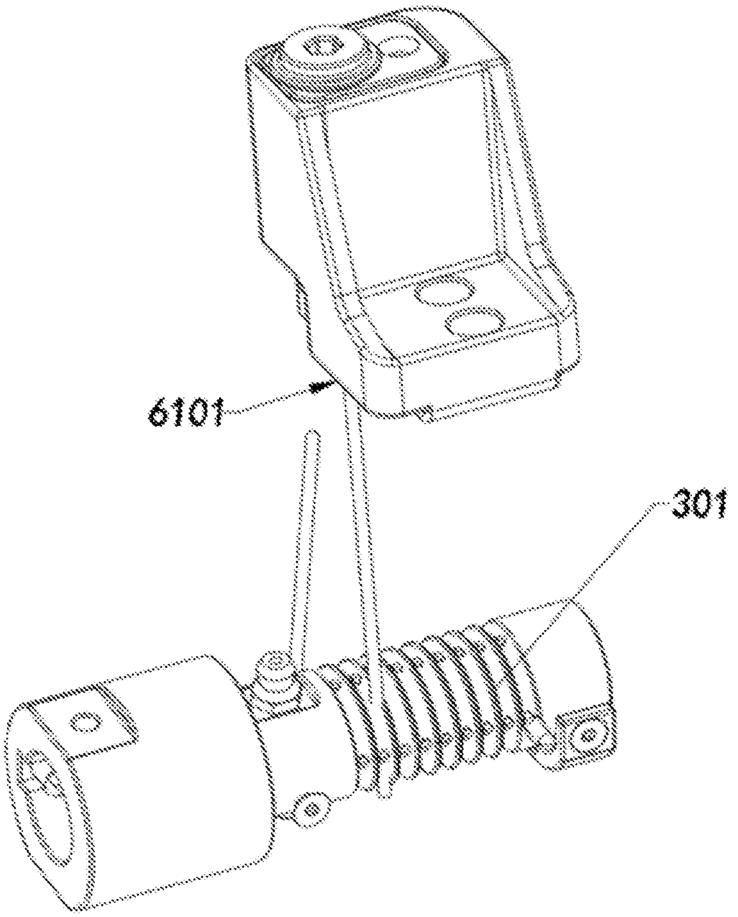
FIG. 2 shows a partially exploded schematic view of rehabilitation training equipment of the present invention.
Figure 3:
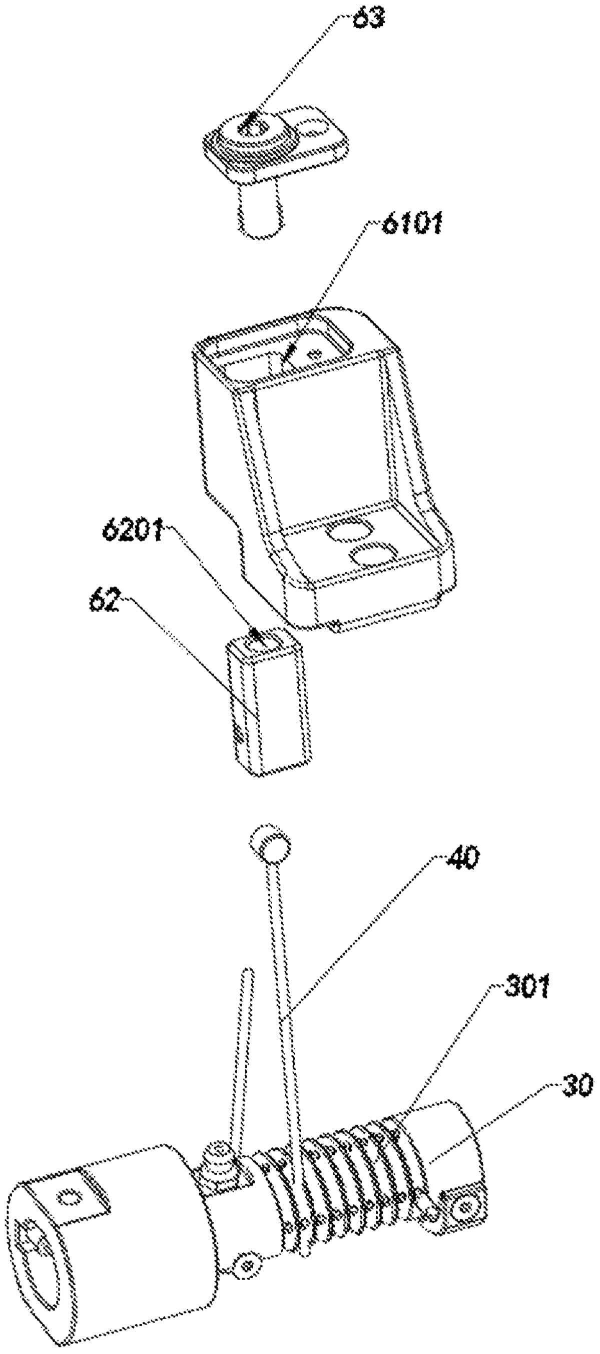
FIG. 3 is an exploded view showing a partial structure of rehabilitation training equipment according to the present invention.
Figure 4:
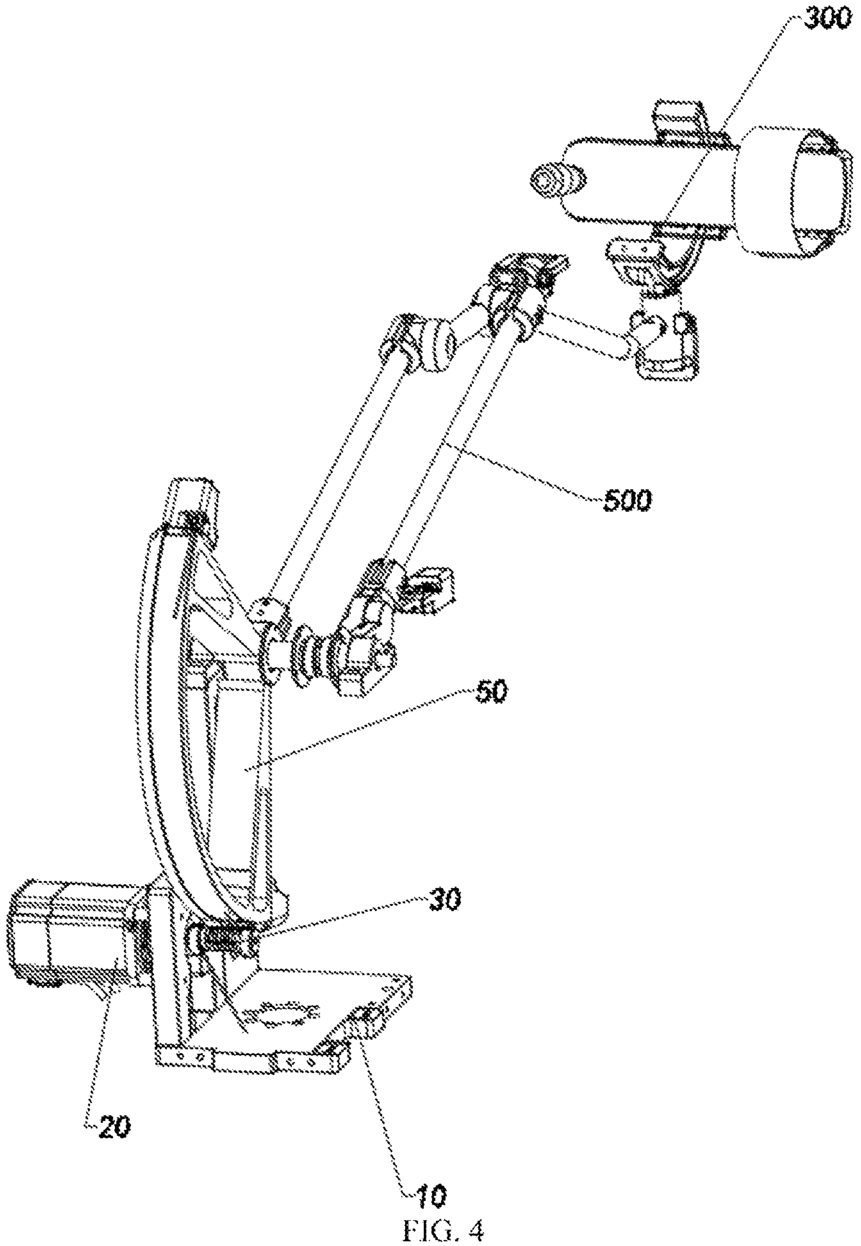
FIG. 4 shows a schematic view of a partial structure of rehabilitation training equipment of the present invention in one state.

Rehabilitation exercise equipment according to a preferred embodiment of the present invention will be described in detail below with reference to the accompanying drawings FIGS. 1 to 4 of the description. The rehabilitation exercise equipment comprises at least a rope transmission device 100 and a limb fixing assembly 300. The limb movement assembly 300 is connected to the rope transmission device 100 such that the spatial position of the limb movement assembly 300 can be adjusted when the rope transmission device 100 is in operation. In addition, since the limb fixing assembly 300 is carried by the rope of the rope transmission device 100, the rope transmission device 100 has little noise during the operation and when the limb fixing assembly 300 is driven, it can move gently.

Specifically, the rope transmission device 100 includes a device main body 10, a transmission assembly 20, a rope winding shaft 30, at least two ropes 40, and an oscillating piece 50. Preferably, the rope 40 is implemented to be made of a metallic material. Preferably, the rope 40 is a steel wire rope.

The rope winding shaft 30 is rotatably connected to the transmission assembly 20 and mounted to the device main body 10. The oscillating piece 50 is swingably supported to the device main body 10 by two of the ropes 40.

In one embodiment, the rope winding shaft 30 is rotatably connected to an output shaft of the transmission assembly 20 such that the rope winding shaft 30 can be rotated driven by the transmission assembly 20. It is understandable that where the transmission assembly 20 is embodied as a motor, the rope winding shaft 30 may be embodied as the output shaft of the motor.

The peripheral edge of the outer wall of the rope winding shaft 30 is provided with at least one continuous rope winding spiral groove 301. The rope winding spiral groove 301 has an inner end proximal to the transmission assembly 20 and an outer end distal to the transmission assembly 20. After one end of one of the ropes, 40 is fixed, it is partially wound in a part of the groove near the inner end of the rope winding spiral groove 301 of the rope winding shaft 30, and the rope 40 is further fixed to one end of the oscillating piece 50 around the circumference that the oscillating piece 50 oscillates. After one end of the other of the ropes 40 is fixed, it is partially wound in a part of the groove adjacent to the rope winding spiral groove 301, and the rope 40 is fixed to the other end of the oscillating piece 50 around the circumference that the oscillating piece 50 oscillates. Therefore, two ends of the oscillating piece 50 are connected to one of the ropes 40, respectively.

It is worth mentioning that the oscillating piece 50 is mounted at the device main body 10 in such a manner that an oscillation axis around which the oscillating piece 50 oscillates is collinear with the rotation axis of the rope winding shaft 30.

It is worth mentioning that when the transmission assembly 20 drives the rope winding shaft 30 to rotate in one direction, one of the ropes 40 is continuously wound into the rope winding spiral groove 301 and the other rope 40 is continuously wound out of the rope winding spiral groove 301. Accordingly, the part of the rope 40 wound around the oscillating piece 50 on the rope 40 continuously wound in the rope winding spiral groove 301 is wound away from the oscillating piece 50 and drives the oscillating piece 50 to rotate. The part of the rope 40 wound around the oscillating piece 50 on the rope 40 continuously wound out of the rope winding spiral groove 301 is wound around the outer wall of the oscillating circumference of the oscillating piece 50.

It is worth mentioning that when the transmission assembly 20 drives the rope winding shaft 30 to rotate in the opposite direction, the oscillating piece 50 will rotate in the opposite direction.

Therefore, the oscillating piece 50 can oscillate back and forth on the device main body 10. It is worth mentioning that the limb fixing assembly 300 is mounted to the oscillating piece 50 such that when the oscillating piece 50 oscillates, the limb fixing assembly 300 follows the oscillating piece 50 in a synchronized motion.

It is worth mentioning that, since the two ropes 40 are guided by the rope winding spiral groove 301 on the rope winding shaft 30 and can be always maintained in the rope winding spiral groove 301 during the winding and unwinding process, the ropes 40 are not wound away from the rope winding spiral groove 301, thereby preventing the ropes 40 from being wound around each other during the winding and unwinding process.

Preferably, the distances between two adjacent groove bodies of the rope winding spiral groove 301 are equal so that the oscillating piece 50 can gently oscillate. Therefore, the limb fixing assembly 300 connected to the oscillating piece 50 does not move violently, thereby effectively preventing the user from being injured due to the unstable movement of the transmission mechanism during the rehabilitation training.

Further, the oscillating piece 50 has a circular arc outer wall portion 51 and at least one radial connecting portion 52 connected to the circular arc outer wall portion 51. The radial connecting portion 52 is rotatably mounted to the device main body 10.

The rope transmission device 100 comprises a rope tightener 60. Each of the ropes 40 is connected to the rope tightener 60 in a way that can be tightened so that the ropes 40 can be tightened by the rope tightener 60.

Two ends of the circular arc outer wall portion 51 are respectively provided with a rope tightener 60 for respectively fixing one rope 40. That is, one end of the rope 40 is fixed to the rope tightener 60 provided at one end of the circular arc outer wall portion 51. The other rope 40 is fixed to the rope tightener 60 provided at the other end of the circular arc outer wall portion 51. Both of the ropes 40 are wound out and wound in from the outer wall of the circular arc outer wall portion 51 during the process that the swinging member 50 is driven to oscillate.

Preferably, the outer wall of the circular arc outer wall portion 51 is provided with a limiting groove 5101 to prevent the rope 40 from slipping off when the two ropes 40 are wound out and wound in the outer wall of the circular arc outer wall portion 51.

Each of the ropes 40 is connected to the rope tightener 60 that can be tightened in a tangential direction tangential to the circular arc outer wall portion 51. It could be understood that the rope 40 has some extensibility. Therefore, when the rope transmission device 100 is continuously operated for a certain time, the tension of the rope 40 is weakened. If the tension of the rope 40 continues to weaken, the rope 40 will be too loose and may be in one groove body of the rope winding spiral groove 301, i.e., the rope 40 that should have been wound in two adjacent groove bodies will be wound into the same groove body. This causes the oscillating piece 50 on the rope transmission device 100 to oscillate unevenly and it may even not work normally.

However, in the embodiment of the present invention, the rope 40 is connected to the rope tightener 60 in a way that can be tightened in a tangential direction tangential to the circular arc outer wall portion 51, such that when the tension of the rope 40 decreases, the rope 40 can be tightened by the rope tightener 60. In this way, since the rope 40 is maintained within a predetermined tension range when the rope 40 is wounded and unwounded, the rope 40 can be always guided into the rope winding spiral groove 301, thereby ensuring the transmission stability of the rope transmission device 100.

In one embodiment, the rope tightener 60 includes a base 61, a moving block 62, and a tightness adjusting piece 63. The base 61 is fixed to one end of the circular arc outer wall portion 51 of the oscillating piece 50. The base 61 is provided thereon with a perforation 6101 extending in a tangential direction tangential to the outer wall of the circular arc outer wall portion 51. The moving block 62 can be slidably connected to the base 61 in a direction in which the perforation 6101 extends. The moving block 62 is connected to the tightness adjusting piece 63 in a way that can be driven.

It is worth mentioning that each of the ropes 40 is fixed to the moving block 62 after passing through the perforation 6101. In this way, when the tightness of the rope 40 needs to be increased, that is, the tension of the rope 40 is increased, by operating the tightness adjusting piece 63, the moving block 62 can be enabled to slide in the direction of tightening the rope 40. On the contrary, when the tightness of the rope 40 needs to be lowered, that is, the tension of the rope 40 is reduced, the moving block 62 can be enabled to slide in the direction of releasing the rope 40 by operating the tightness adjusting piece 63.

Preferably, the tightness adjusting piece 63 is embodied as a rotatable screw, and the moving block 62 is correspondingly provided with a threaded hole matching the screw. The extending direction of the threaded hole is parallel to the direction in which the moving block 62 moves, so that the moving block 62 can always move in a tangential direction tangential to the outer wall of the circular arc outer wall portion 51 when the tightness adjusting piece 63 is operated. In this way, after the tension of the rope 40 is adjusted, the included angle with the extending direction of the rope winding spiral groove 301 on the rope winding shaft 30 always does not change, so that the rope 40 can always be guided to wind into or wind out of the rope winding guide groove 301 by the rope winding guide groove 301 after the rope winding shaft 30 is driven to rotate.

Specifically, the base 61 is formed with a perforation 6102 communicating with the perforation 6101. The moving block 62 is slidably mounted to the perforation 6102. The moving block 62 is provided with a mounting hole 6201 in a tangential direction tangent to the outer wall of the circular arc outer wall portion 51. The rope 40 is limited by the moving block 62 after passing through the perforation 6101 and the mounting hole 6201 on the moving block 62. It is worth mentioning that the aperture of the mounting hole 6201 is larger than the aperture of the perforation 6101, so that when the rope 40 is moved by the moving block 62, the rope 40 does not rotate but slides only in a direction tangential to the circular arc outer wall portion 51.

The rehabilitation exercise equipment includes at least two rope transmission devices 100 and at least two link mechanisms 500. The rotation axes that rope winding shafts 30 in the two rope transmission devices 100 rotate around are perpendicular to each other. The limb fixing assembly 300 is fixed to the oscillating piece 50 of one rope transmission device by one link mechanism 500, and the limb fixing assembly 300 is fixed to the oscillating piece of the other rope transmission device by the other link mechanism 500.

It should be understood by persons skilled in the art that the embodiments of the invention shown in the foregoing description are by way of example only and are not limiting of the invention. The objects of the present invention have been fully and effectively achieved. The functional and structural principles of the present invention have been shown and described in the embodiments, and any variations or modifications may be made to the implementation modes of the invention without departing from the principles described.

What is claimed is:

1. A rope transmission device for driving a limb fixing assembly, the rope transmission device comprising:

a device main body;

a transmission assembly, wherein the transmission assembly is provided to the device main body;

a rope winding shaft, wherein the rope winding shaft is rotatably connected to the transmission assembly, and at least one continuous rope winding spiral groove is provided along a peripheral edge of an outer wall of the rope winding shaft, the rope winding shaft having an inner end proximal to the transmission assembly and an outer end remote from the transmission assembly;

an oscillating piece for driving the limb fixing assembly, wherein the oscillating piece is provided on the device main body in such a way that an oscillating axis around which the oscillating piece oscillates is collinear with a rotation axis of the rope winding shaft; and two ropes, wherein one end of one of the ropes is fixed to the rope winding shaft, and it is partially wound in a portion of the rope winding spiral groove near the inner end of the rope winding spiral groove, and the rope is further fixed to one end of the oscillating piece around a circumference that the oscillating piece oscillates; one end of the other rope is fixed to the rope winding shaft, it is partially wound in a portion of the rope winding spiral groove near the rope winding spiral groove, and the rope is fixed to the other end of the oscillating piece around the circumference that the oscillating piece oscillates, wherein the rope transmission device comprises two rope tighteners, and the oscillating piece has a circular arc outer wall portion and at least one radial connecting portion connected to the circular arc outer wall portion, the radial connecting portion being provided to be rotatably mounted to the device main body about the oscillating axis, wherein each of the two ropes is respectively connected to one rope tightener in a way that can be tightened in a tangential direction tangential to the circular arc outer wall portion.

2. The rope transmission device according to claim 1, wherein distances between two adjacent groove bodies of the rope winding spiral groove are equal.

3. The rope transmission device according to claim 1, wherein the transmission assembly is embodied as a motor, and the rope winding shaft is embodied as an output shaft of the motor.

4. The rope transmission device according to claim 1, wherein the rope tighteners are mounted to two ends of the oscillating piece.

5. The rope transmission device according to claim 4, wherein the rope tightener comprises a base, a moving block, and a tightness adjusting piece, the base being fixed to one end of the circular arc outer wall portion of the oscillating piece, and the base being provided with a perforation extending in a tangential direction tangential to the outer wall of the circular arc outer wall portion, wherein the moving block can be slidingly connected to the base in a direction in which the perforation extends, and the moving block is connected to the tightness adjusting piece in a way that can be driven.

6. The rope transmission device according to claim 5, wherein the tightness adjusting piece is embodied as a rotatable screw and the moving block is correspondingly provided with a threaded hole matching with the screw, the threaded hole extending in a direction parallel to the direction in which the moving block moves.

7. The rope transmission device according to claim 6, wherein the base forms a sliding cavity, the moving block is slidably mounted in the sliding cavity, the moving block is provided with a mounting hole in a tangential direction tangential to the outer wall of the circular arc outer wall portion, the rope is limited by the moving block after passing through the perforation and the mounting hole on the moving block, and an aperture of the mounting hole is larger than the aperture of the perforation.

8. Rehabilitation exercise equipment, wherein the rehabilitation exercise equipment comprises:

the rope transmission device according to claim 1; and a limb fixing assembly, wherein the limb fixing assembly is connected to the oscillating piece of the rope transmission device.

9. The rehabilitation exercise equipment according to claim 8, wherein the rehabilitation exercise equipment comprises at least two rope transmission devices and at least two link mechanisms, and rotation axes that the rope winding shafts in the two rope transmission devices rotate around are perpendicular to each other; the limb fixing assembly is fixed to the oscillating piece of one of the rope transmission devices by one link mechanism, and the limb fixing assembly is fixed to the oscillating piece of the other rope transmission device by the other link mechanism.

* * * * *